US008032314B2

(12) United States Patent
Barron et al.

(10) Patent No.: US 8,032,314 B2
(45) Date of Patent: Oct. 4, 2011

(54) MLD-MODIFIED SYNTHETIC OCEAN PROFILES

(75) Inventors: Charlie N. Barron, Slidell, LA (US); Robert W. Helber, Slidell, LA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 464 days.

(21) Appl. No.: 12/239,842

(22) Filed: Sep. 29, 2008

(65) Prior Publication Data

US 2010/0082264 A1    Apr. 1, 2010

(51) Int. Cl.
*G01F 17/00* (2006.01)
(52) U.S. Cl. .......................................................... 702/50
(58) Field of Classification Search ...................... 702/50
See application file for complete search history.

(56) References Cited

U.S. PATENT DOCUMENTS 7,345,596 B2 * 3/2008 Wallach et al. ............... 340/984

OTHER PUBLICATIONS

R. Helber et al., "Evaluating the sonic layer depth relative to the mixed layer depth," J. Geophys. Res., vol. 113, C07033, doi:10.1029/2007JC004595, 2008.
D.N. Fox et al., 2002, "The Modular Ocean Data Assimilation System," Oceanography, vol. 15, pp. 22-28.
D.N. Fox et al., 2002, "The Modular Ocean Data Assimilation System (MODAS)," J. Atm and Oceanic Tech., vol. 19, pp. 240-252.
Barron et al., Predicting acoustic impact on marine mammals: use of satellite observations and ocean models in globally deriving sound speed profiles for estimates of transmission loss, 2006 Ocean Sciences, Feb. 20-24, 2006, Honolulu, HI.
Barron et al., Impact of assimilating modified synthetic profiles on global ocean sound speed prediction, 88th Annual Meeting of the AMS, 12th conference on IOAS-AOLS, New Orleans, LA, Jan. 24, 2008.
Jain et al. 2007—Estimation of sound speed profiles using artificial neural networks, IEEE Geoscience and Remote Sensing Letters, vol. 3, No. 4, Oct. 2006, pp. 467-470.

* cited by examiner

*Primary Examiner* — Drew A Dunn
*Assistant Examiner* — Stephen Cherry
(74) *Attorney, Agent, or Firm* — Amy L. Ressing; Kathleen Chapman

(57) ABSTRACT

A method for providing a more accurate synthetic profiles of temperature, salinity and sound speed of the ocean over an area of interest is provided by using a value of the mixed layer depth in addition to values of surface temperature and surface height in an ocean modeling system such as the Modular Ocean Data Assimilation System (MODAS) system developed for the U.S. Navy. The method of the present invention compares the predicted or observed mixed layer depth for the area of interest, for example, as obtained from remote sensing or upper ocean modeling, to a mixed layer depth estimated from an initial synthetic profile, and determines which is deeper, termed the reference mixed layer depth. The method then derives a modified temperature and salinity synthetic profile by setting the temperature and salinity equal to the surface values at depths less than or equal to the reference mixed layer depth and using an algorithm to estimate temperature and salinity at depths below the reference mixed layer depth.

16 Claims, 12 Drawing Sheets

*Underwater Acoustics*

*Sonic Layer Depth (SLD) and Range of Transmission Loss*

*First-Generation MODAS Synthetic Profile*

MODAS – Predicted T and S $\check{T}(z) = f(T_{clim}, SST, SSH)$
$\check{S}(z) = g(\check{T}(z))$
Minimize expected T error: $\sum (\check{T} - T_{obs})^2$ at each depth MODAS-Predicted Values
vs. Observed Values MODAS-Predicted Values
vs. Observed Values

SLD and Range of Transmission Loss Models vs. Observation

SLD and Range of Transmission Loss Models vs. Observation

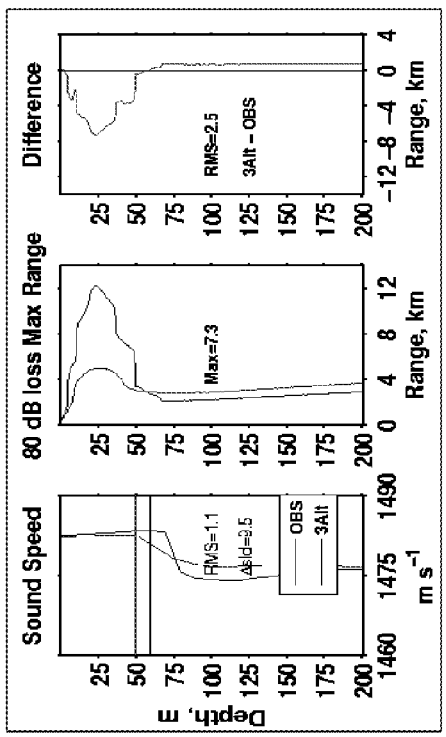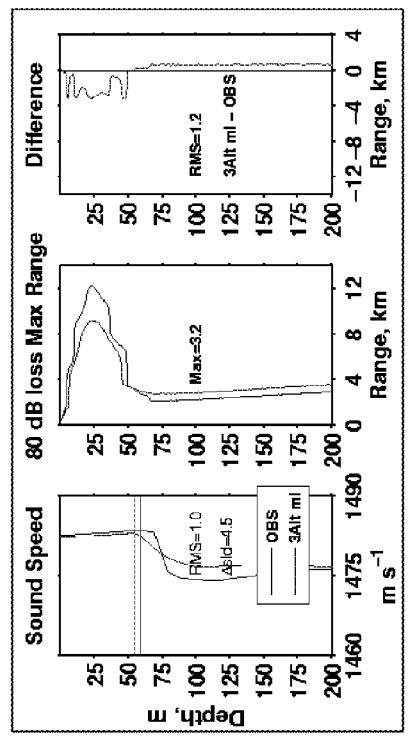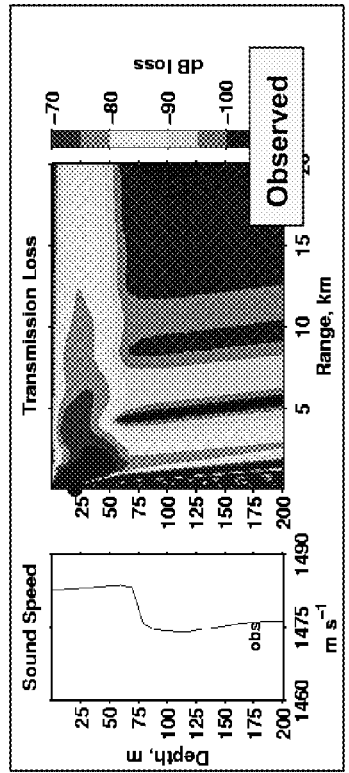

MLD-MODIFIED SYNTHETIC OCEAN PROFILES

TECHNICAL FIELD

The present invention relates to estimation and prediction of underwater acoustic characteristics using a synthetic profile.

BACKGROUND

The properties of ocean waters affect the planning and execution of numerous underwater applications, both military and civilian. One important property is the speed of sound in ocean waters.

The transmission and reception of sound under water is used in many military and civilian applications. Knowledge of the sound speed structure can be of particular importance since it has a direct impact on the way sound energy travels through the ocean. For example, military applications such as underwater sonar and other sensor systems depend on sound energy as the primary method of detecting and locating submarines and mines. Active sonar systems send pulses of sound outward into the water and listen for the returned echo that "bounces" off a target. Passive sonar systems do not actively send out sound signals but instead listen for sound that is transmitted from the target itself, such as the sounds generated by a submarine. In both cases, the structure of the sound speed environment can significantly affect the path and other characteristics of the sound energy, and thus, knowledge of the sound speed structure can be critical to the ability to detect and locate the desired targets. Many civilian industries such as commercial shipping and fishing also utilize sonar in their operations, and thus knowledge of the sound speed structure is equally essential to civilian operations as it is to military ones.

The speed of sound in seawater at any point in the water is dependent on the water's temperature, salinity, and pressure at that point. However, in many parts of the ocean salinity of the water is generally related to its temperature, so that if the temperature of the water and the local temperature-salinity relationship are known, its salinity also can be determined. In addition, sound speed is less sensitive to typical variations in salinity than it is to typical variations in temperature and pressure. For this reason, sound speed in the ocean is often represented as a function of temperature and pressure alone, since salinity can be viewed as being part of the temperature characteristic. As the temperature of the water decreases, so does the speed of sound as it travels through the water. On the other hand, as the water's pressure increases as the depth increases, the speed of sound will increase. However, over typical ranges of upper ocean temperature and pressure variability, the effect of temperature on sound speed is greater than the effect of the pressure.

In addition, there is a depth in the upper ocean, known as the Sonic Layer Depth (SLD), where the sound speed reaches a local maximum. In a simplified representation of the ocean as a warm isothermal surface layer that transitions to a cool deep layer, the SLD is at the base of the isothermal surface layer where sound speed increases due to increasing pressure. In a more complex ocean situation, there may be multiple local maxima and various criteria for identifying a depth as the SLD. Knowing the location of the SLD is important because acoustic energy is refracted away from the SLD, i.e., is refracted upwards above the SLD and refracted downwards below the SLD. Thus, acoustic energy above the SLD tends to stay above that depth, while acoustic energy below tends to stay below. Acoustic energy trapped in a surface duct, i.e., between the surface and the SLD, tends to travel much greater horizontal distances than acoustic energy that spreads into the deep ocean. Consequently, more accurate estimates of the SLD will allow more accurate prediction of ranges of civilian or military acoustic communication and detection.

In addition, the SLD at any point has a corresponding Minimum acoustic Cutoff Frequency (MCF) which affects the behavior of sound between the surface and the SLD. The speed of sound c is related to its frequency f and wavelength $\lambda$ by the relation $f=c/\lambda$. If an SLD exists, then some wavelengths are short enough (frequencies are high enough) to fit in the surface duct above the SLD, while some wavelengths are too long (frequencies too low) to fit in the surface duct. This relationship is generally expressed as an MCF (See, e.g., R. Helber et al., "Evaluating the sonic layer depth relative to the mixed layer depth," *J. Geophys. Res.*, Vol. 113, C07033, doi:10.1029/2007JC004595, 2008), which depends on the vertical variations of sound speed above the SLD. If the frequency f of a sound is greater than the MCF, its wavelength $\lambda$ is short enough to fit in the surface acoustic duct between the surface and the SLD. If the frequency of a sound is less than the MCF, then its wavelength will be too long to be trapped, and the sound will penetrate the SLD boundary, where it will attenuate from its source by spherical spreading, with its intensity I decreasing as the inverse square of the distance from the source, i.e., $$I = \frac{1}{d^2},$$

where d is the horizontal distance from the source. On the other hand, if the sound is "trapped" in the acoustic duct between the SLD and the surface (i.e., the frequency f>MCF), it will spread cylindrically, with its intensity decreasing as the simple inverse of the distance, i.e., $$I = \frac{1}{d}.$$

Consequently, higher-frequency sound will travel farther horizontally within an acoustic duct than lower-frequency sound, while the lower-frequency sound is free to spread through the vast ocean below the SLD. Since the MCF is dependent on the SLD, having an accurate profile of the location and characteristics of the SLD can be an important factor in knowing and working within the upper ocean's acoustic environment.

Since the SLD is a local sound speed maximum, it may also be the upper bound for an intermediate sound channel or the deep sound channel, sometimes called the Sound Fixing and Ranging (SOFAR) channel. These subsurface channels trap acoustic energy based on downward refraction above and upward refraction below. There is a minimum frequency that can be trapped in the subsurface sound channel, and while this minimum frequency depends on the thickness of and sound speed structure in the subsurface channel, the formulation differs from the surface duct that has reflection from the ocean surface. Identification of intermediate or deep sound channels is important because acoustic energy trapped in the channels travels much greater horizontal distances than acoustic energy at frequencies too low to be trapped.

The SLD defines the base and many other characteristics of the surface acoustic duct, and may also define the location of the upper boundary of the possible intermediate or deep sound channels. Knowing the location and properties of an acoustic duct can influence many decisions relating to underwater operations, and particularly can influence decisions regarding the placement of objects underwater.

For example, this knowledge can be an important aspect determining the placement of underwater acoustic sensors. Sensors will best detect sound emanating from their targets if they are placed on the same side of the SLD boundary (i.e., temperature interface) as the target. On the other hand, if the goal of object placement is to "hide"the object, such as may be the case with determining the travel path of a submarine, the object is best placed on the opposite side of the SLD boundary, since the SLD boundary can act to insulate the sound from detection, for example, from surface-based sensors. Conversely, knowing the SLD at any particular point in the ocean, and thus the MCF at that point, can permit operators to "tune" their equipment to the appropriate frequency to enable detection or hiding of an object, as the case may be. Acoustic communication is affected in the same manner as acoustic detection. Thus, for all of these reasons, it is highly desirable to obtain accurate information regarding the SLD and the vertical and horizontal structure of sound speed in the water.

Another important characteristic of the ocean is its Mixed Layer Depth (MLD). The MLD is the thickness of the water's surface layer that has a nearly constant temperature, salinity, and density due to turbulent mixing at the top of the layer and shear at the bottom. Information regarding the MLD can be obtained by direct sensing, for example, as measured by Conductivity-Temperature-Depth (CTD) recorders on a variety of platforms throughout the global ocean. Information regarding the MLD can also be estimated by use of ocean models such as the LDNK06 or KRH00 ocean models, which can estimate the MLD based on measured readings of temperature, salinity, or both. See, e.g., R. Helber et al., "Evaluating the sonic layer depth relative to the mixed layer depth," *J. Geophys. Res.*, Vol. 113, C07033, doi: 10.1029/2007JC004595, 2008.

Other ocean models also are used to provide estimates of ocean properties when accurate real-time data are available. The modular ocean data assimilation system (MODAS) has been developed to meet the U.S. Navy's need for rapid estimates of present and near-term ocean conditions, particularly in situations where little or no in situ data are not available. MODAS comprises a collection of programs and utilities for combining remotely sensed data and in situ measurements to create a synthetic profile of ocean conditions such as temperature and salinity and of derived aspects such as density, sound speed, and mixed layer depth. D.N. Fox et al., 2002, "The Modular Ocean Data Assimilation System,"*Oceanography*, Vol. 15, pp. 22-28; D.N. Fox et al., 2002, "The Modular Ocean Data Assimilation System (MODAS)," *J. Atm and Oceanic Tech.*, Vol. 19, pp. 240-252.

MODAS synthetic profiles are produced based on climatological average temperature, climatological relationships between temperature and salinity, real-time estimates of sea surface temperature (SST), real-time estimates of sea-surface height (SSH), and climatological regression coefficients used in a polynomial that expresses a temperature difference at a series of depths as a function of SSH and SST. The mean temperature profile and regression coefficients are defined at up to 36 standard depths at each point in a variable horizontal grid from one to ⅛ degree spacing in latitude and longitude. The coefficients are defined using a regression model to minimize the expected squared errors of temperature. The regression coefficients, climatological averages and coefficients to predict salinity from temperature are defined every-other month based on minimizing the expected squared errors using the synthetics to model millions of historical observations.

Ocean modeling systems such as MODAS can also be used to estimate the SLD of an area of interest using synthetic profiles of the ocean's temperature and salinity for that area. However, modeled estimates of the SLD based on such synthetic profiles lead to a shallow bias in the estimates of the sonic layer depth and a corresponding high bias in estimates of the minimum cutoff frequency of acoustic signals propagated in the surface acoustic duct.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter.

The present invention provides a method for providing a more accurate synthetic profile of the ocean at an area of interest by using a value of the mixed layer depth in addition to predicted values of temperature and salinity from an ocean modeling system such as the Modular Ocean Data Assimilation System (MODAS) system developed for the U.S. Navy. The method of the present invention compares the actual mixed layer depth for the area of interest, for example, as obtained from remote sensing, to a mixed layer depth predicted from a synthetic profile, and determines which is deeper. The method then derives a modified temperature and salinity profile by setting the temperature and salinity equal to the surface values at depths less than or equal to that mixed layer depth and using an algorithm to estimate temperature and salinity at depths below the mixed layer depth.

The synthetic profile obtained using this method more accurately reflects actual temperature and salinity at the mixed layer depth and provides a more accurate temperature and salinity gradient than conventional synthetic profiles. Ocean modeling systems can then use this modified synthetic profile to more accurately estimate the sound speed gradient and therefore more accurately estimate the sonic layer depth and the associated transmission loss in the acoustic duct.

BRIEF DESCRIPTION OF THE DRAWINGS

FIGS. 11A-11E further illustrates the impact of the MLD-modified MODAS-modeled Sonic Layer Depth on predictions of acoustic behavior as compared to the observed Sonic Layer Depth and a Sonic Layer Depth according to a standard model.

DETAILED DESCRIPTION

The aspects summarized above can be embodied in various forms. The following description shows, by way of illustration, combinations and configurations in which the aspects can be practiced. It is understood that the described aspects and/or embodiments are merely examples. It is also understood that one skilled in the art may utilize other aspects and/or embodiments or make structural and functional modifications without departing from the scope of the present disclosure.

For example, although the present invention is described in the context of the MODAS synthetic profile system used by the U.S. Navy, the methods for determining a value of temperature and salinity described herein can equally be applied to any other system or method for developing a synthetic profile of ocean or other waters, such as use of synthetic profiles within the Navy Coupled Ocean Data Assimilation System. In addition, although the present invention is described in the context of a synthetic profile of temperature and salinity as a function of depth wherein a single mixed layer depth is used to modify the profile, the methods described herein can equally be applied to a three-dimensional profile of temperature as a function of latitude and longitude as well as temperature, wherein the mixed layer depth used varies with the latitude and longitude.

Figure 1:
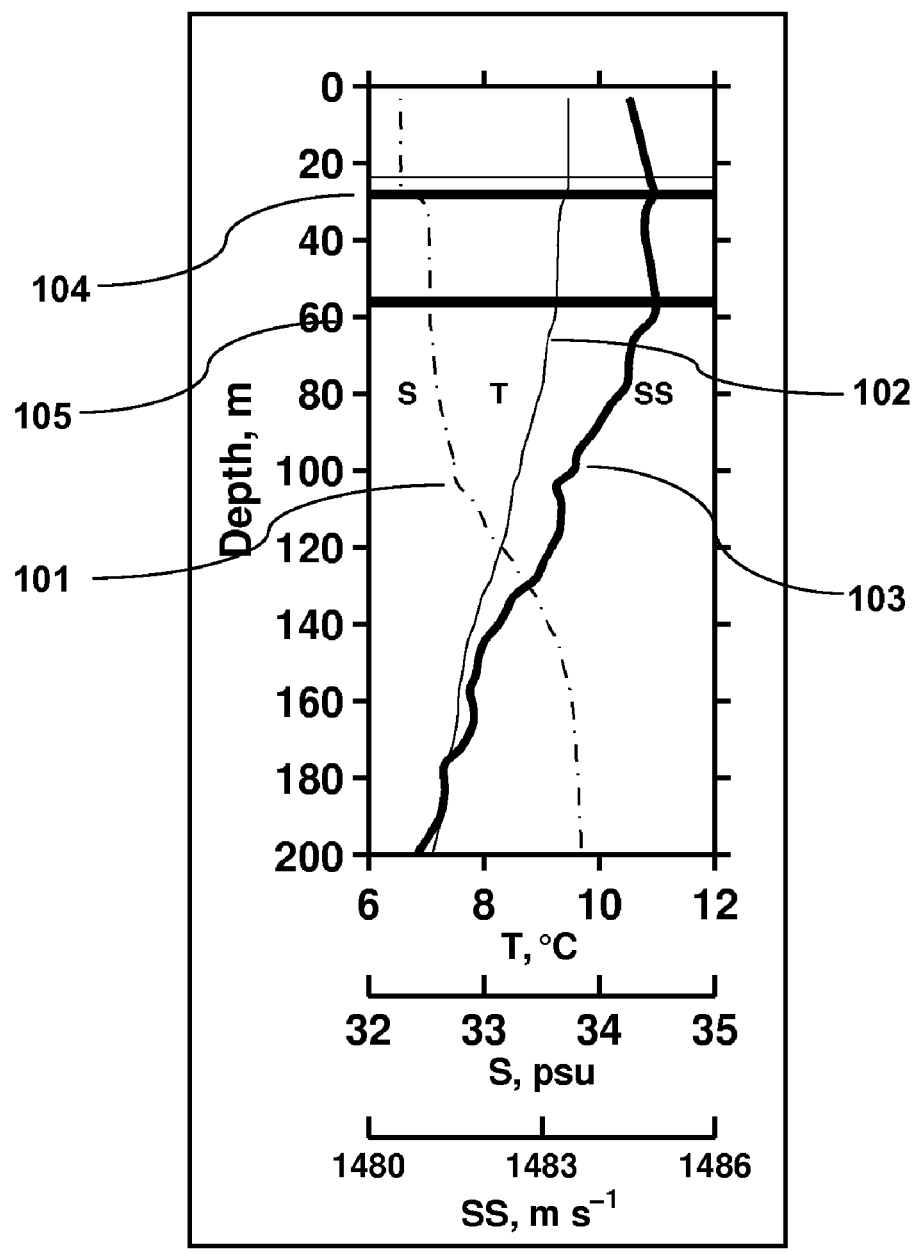
FIG. 1 depicts plots of Mixed Layer Depth, Sonic Layer Depth, temperature, salinity, and sound speed of an exemplary water column.

As noted above, some important characteristics of ocean waters are its temperature, salinity, and pressure at any point, such as a point defined by a particular latitude, longitude and depth. Also as noted above, other important characteristics of the ocean waters are the Mixed Layer Depth (MLD) and the Sonic Layer Depth (SLD). FIG. 1 is a block diagram depicting an exemplary water column showing these characteristics. Plot 101 of temperature T in FIG. 1 shows T decreasing from just over approximately 9° C. at the surface (Depth=0 meters) to approximately 7° C. at a depth of 200 meters. Salinity plot 102 is almost a mirror-image of temperature plot 101, and shows how salinity is related to temperature. Thus, as shown by salinity plot 102 and temperature plot 101, salinity in the exemplary water column of FIG. 1 increases from just over 32 psu (practical salinity units, the measure of salinity commonly used in the art) at the surface, where the temperature is at about 9° C., and increases with depth as the temperature decreases, to just under 34 psu at 200 meters, where the temperature is at about 7° C.

Sound speed also changes with depth, as is shown in "SS" line 103. However, sound speed is a function of both temperature and pressure, and thus its behavior as depth increases is somewhat more complex. Sound speed under water is higher with higher temperature, and so as the temperature drops with depth, so should sound speed. Sound speed also increases with increases in water pressure, and so as the pressure increases with depth, the speed will tend to increase as well. Thus, if the temperature does not change much with depth, the sound speed will increase with depth as a result of the increased pressure. However, the effect of temperature on speed is greater than the effect of the pressure, so that at lower depths the speed of sound will decrease due to the lower temperature, despite the increased pressure at that depth. This behavior is clearly seen in "SS" plot 103, where the sound speed increases from about 1484 m/s at the surface to about 1485 m/s at a depth of 60 meters, while the temperature remains essentially unchanged (exhibiting only a slight decrease). At 60 meters, as seen in the T plot 101, the temperature begins to decrease, and so does the sound speed 103, and the decrease in sound speed follows the decrease in temperature from 60 meters to 200 meters.

FIG. 1 also shows MLD 104 and SLD 105. As noted above, the MLD is a relatively shallow layer of the ocean water characterized by substantially constant temperature and salinity due to the mixing of waters at the surface. Thus, as shown in FIG. 1, MLD 104 extends from the surface to just under 30 meters, with the temperature T and salinity S remaining essentially unchanged throughout that depth as seen from their respective plots 101 and 102. SLD 105 is the depth at which the sound speed reaches a maximum, e.g., due to increased pressure, before beginning to decrease due to the decreasing temperature as depth increases. SLD 105 is also the depth at which the sound speed gradient (i.e., the change in sound speed with changes in depth) goes from being positive to negative, as can be clearly seen in the change in slope of the SS 103 line at the SLD depth of about 60 meters. It should be noted that the SLD can be much shallower than is shown in FIG. 1, and can in fact coincide with the MLD in circumstances where the thermocline and halocline coincide, that is, changes in salinity occur at the same depth as changes in temperature or cases where there is a single local sound speed maximum above the bottom.

As noted above, the SLD has a corresponding Minimum acoustic Cutoff Frequency (MCF), which is the lowest frequency that will remain trapped within the acoustic channel defined by the SLD. If the frequency of a sound transmission is less than the MCF (f<MCF), the sound will penetrate the SLD boundary and will attenuate from its source by spherical spreading, where its intensity I will decrease as the inverse square of the distance from the source, i.e., $$I = \frac{1}{d^2}.$$

On the other hand, if f>MCF, the sound will not penetrate the boundary of the isothermal channel. Instead, it is "trapped" in an acoustic duct between the SLD and the surface, and instead of spreading spherically, it will spread cylindrically, with its intensity decreasing as the simple inverse of the distance, i.e., $$I = \frac{1}{d}.$$

This cutoff frequency MCF may be estimated as $$MCF = \frac{a_1 * V_o}{SLD * a_2(V_{SLD} - V_o)},$$

where $a_1$ and $a_2$ are constants, $V_o$ is the speed of sound at the surface, SLD is the Sonic Layer Depth, and $V_{SLD}$ is the speed of sound at the SLD. A deeper SLD will mean a lower MCF, while a shallower SLD will mean a higher MCF. Thus, for a sound transmission of a particular frequency f, the depth of the SLD will determine whether the sound spreads spherically, with its intensity quickly attenuating, or spreads cylindrically, and thus maintains its intensity for a much longer distance.

Figure 2A:
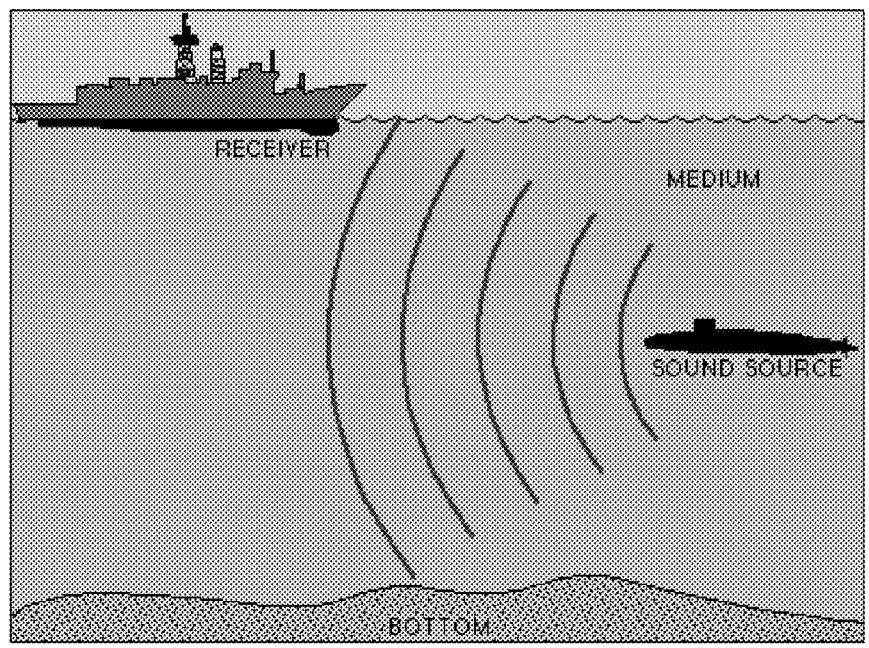
FIGS. 2A and 2B depict aspects of underwater acoustics relevant to the present invention.
Figure 2B:
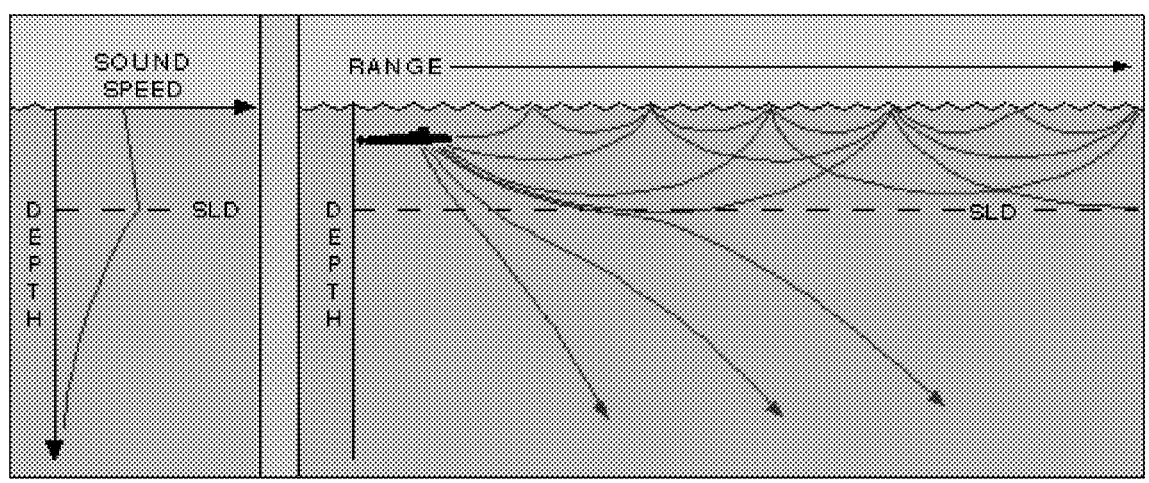

FIGS. 2A and 2B provide further illustration of the acoustic principles relevant to the present invention. FIG. 2A depicts a typical scenario for transmission and reception of acoustic signals. Thus, as seen in FIG. 2A, an underwater object such as a submarine emits acoustic signals which are transmitted through the water as a transmission medium and are received by a surface-based receiver such as one on board a surface ship. Of course, other configurations are equally possible, such as one in which the surface ship emits communication or other signals which are received by an underwater sensor or one in which both the source and receiver/sensor are underwater, and the principles of the present invention are equally applicable to all of these scenarios. FIG. 2B illustrates principles relating to the SLD that are relevant to the present invention. As seen in FIG. 2B, the speed of sound can increase as the sound travels from the surface through the water towards the bottom, with the SLD being at the depth where the sound speed reaches a maximum. Also as seen in FIG. 2B, depending on their frequency, sound transmissions can either penetrate the SLD or be "trapped" in an acoustic duct between the SLD and the surface. The sound that penetrates the SLD does not travel very far before attenuating to levels below the detection threshold, whereas the sound that is "trapped" in the acoustic duct carries much farther. These aspects of sound behavior will be discussed in more detail below.

Figure 3A:
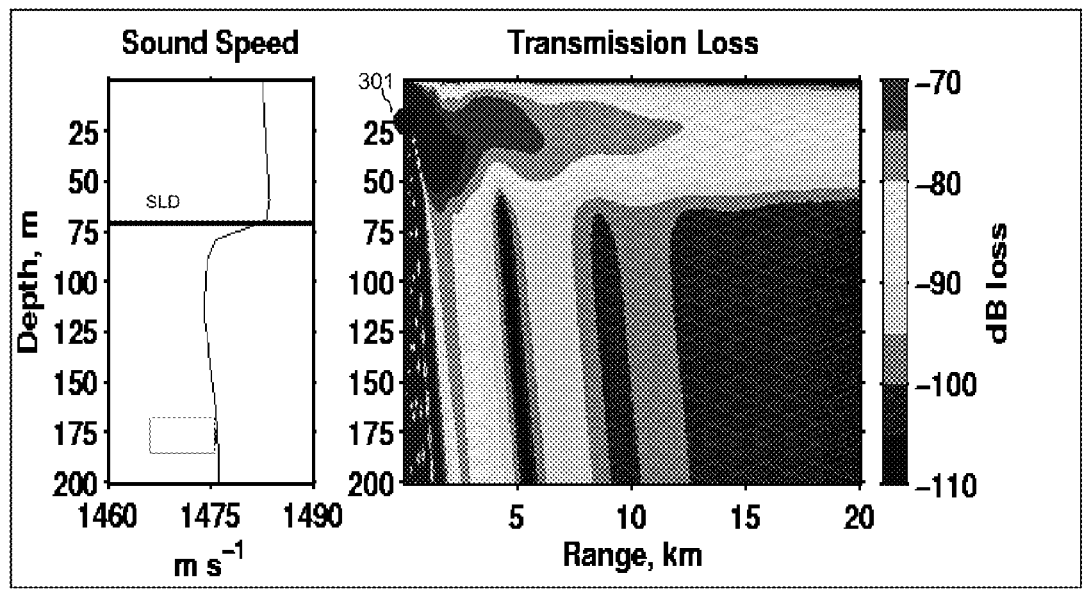
FIGS. 3A and 3B depict the effect of Sonic Layer Depth on the range of transmission loss for a signal at a given frequency.
Figure 3B:
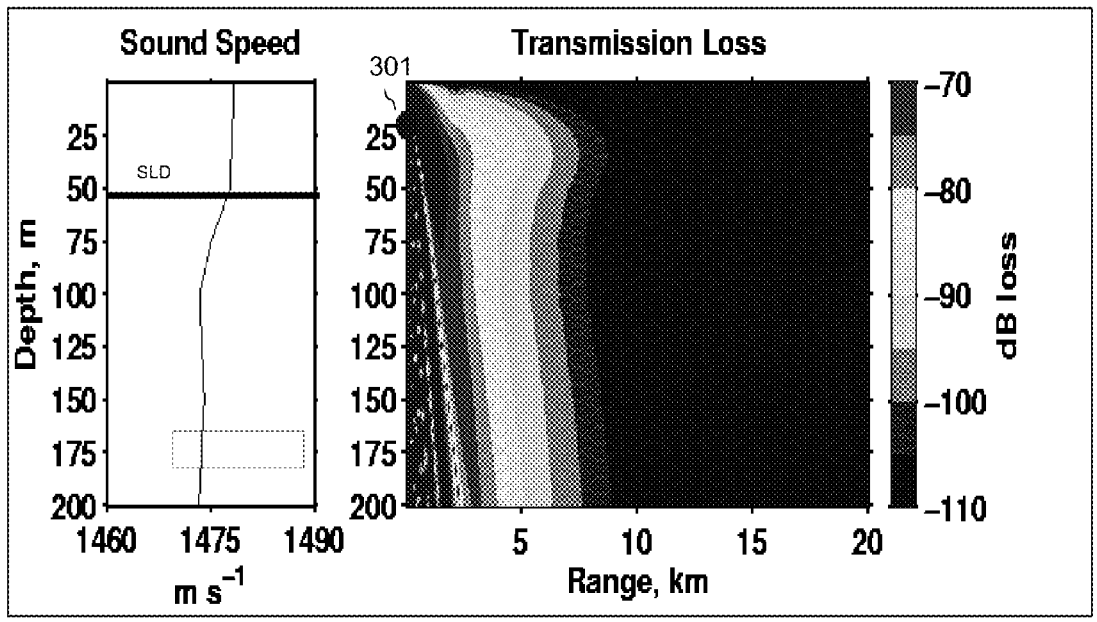

FIGS. 3A and 3B further show this effect of the SLD on the behavior of sound at a particular frequency f. In both FIGS. 3A and 3B, an exemplary transmission having a frequency f of 600 Hz is made from a source 301 approximately 25 meters below the surface. The sound travels through the water columns for FIGS. 3A and 3B at the speeds shown by the sound speed plots in FIGS. 3A and 3B, respectively. In FIG. 3A, this speed reaches a maximum at a depth of approximately 75 meters, and thus the SLD also is at that depth. As shown in FIG. 3A, the frequency f of the transmission, i.e., 600 Hz, is above the MCF for the SLD, and the sound travels for a considerable distance without significant transmission loss. In contrast, in FIG. 3B, the maximum sound speed is near the surface, as seen by the negative slope of the sound speed plot, and thus the SLD is very shallow, almost near the surface. In this case, the MCF will be very high (since the SLD in the denominator is small). Thus, the same transmission as in FIG. 3A at 600 Hz will be below the MCF for the water column in FIG. 3B, and as shown in FIG. 3B, the transmission will quickly attenuate at a short distance.

FIGS. 3A and 3B clearly show the importance, therefore, of having an accurate estimate of the SLD. If the estimate of the SLD is too shallow, the estimate of the MCF will be too high, and transmissions at the higher end of the frequency range may attenuate more quickly than expected. On the other hand, if the estimate of the SLD is too deep, the estimate of the MCF will be too low, and transmissions may be carried farther away from the source than is desired. Also, correct information on the sonic layer depth and sound speed structure can be used to devise optimum source receiver configurations above and below the SLD to either maximize or minimize detection probability or communication range. In general, acoustic energy with frequencies above the MCF will not cross the SLD, so sensors looking for those frequencies need to be on the same side of the SLD as the source.

In many cases, either onboard ship or at land-based stations remote from the ocean, detailed information regarding the characteristics of the SLD or the water column in general are not available, especially on a real- or near real-time basis. For this reason, it is often desirable to use a model that can provide estimates of this information. If no recent satellite or in-water measurements are available, the best information might be a climatology model, which uses historical observations to estimate present conditions as an average of historical observations. This is often referred to as a "climatology" or sometimes as a "static climatology," since it does not change over time or respond to additional observations.

Figure 4:
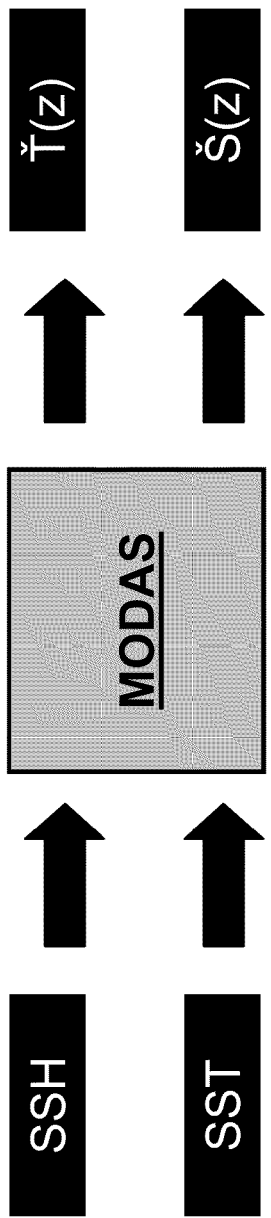
FIG. 4 depicts aspects of a conventional MODAS synthetic profile of temperature and salinity of ocean waters.
Figure 4:
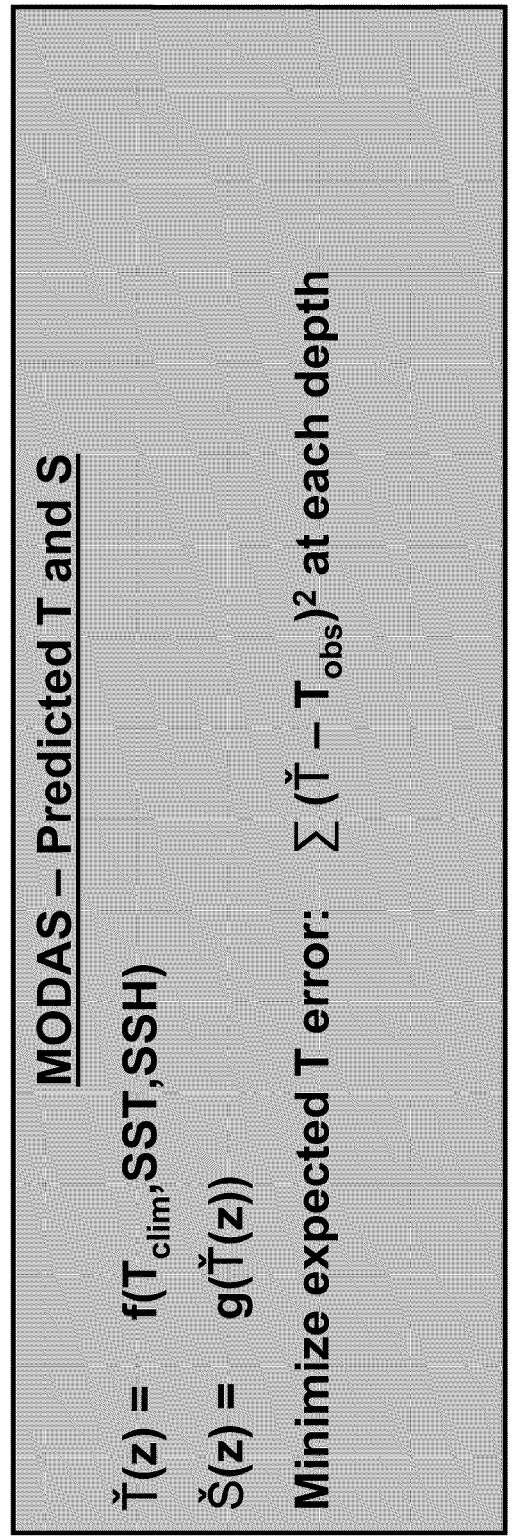

In addition to climatology models, the U.S. Navy has developed the MODAS synthetic ocean profile described above. This is sometimes called a dynamic climatology, as it uses historical trends to predict the subsurface from recent surface observations. Basically, the synthetics use a statistical model that says the relationship between the surface and subsurface now will be similar to the average relationship between the surface and subsurface in the past. As seen in FIG. 4, MODAS takes as input measured values of sea surface height (SSH), sea surface temperature (SST) and develops predicted values of temperature and salinity based on those values plus climatological (i.e., historical) trends relating surface temperature and height to subsurface temperature. Thus, the MODAS-predicted value of temperature as a function of depth z is $\tilde{T}(z)=f(T_{clim}, SSH, SST)$, with the MODAS-predicted value of salinity being a function of temperature $S(z)=g(\tilde{T}(z))$. These predicted values from the MODAS synthetic ocean profile can then be used with other ocean modeling systems such as the Navy Global Ocean Modeling System to provide predictions sound speed and sound speed gradient, and thus can be used to provide predictions of the location of the MLD and the SLD.

Figures 5A, 5B:
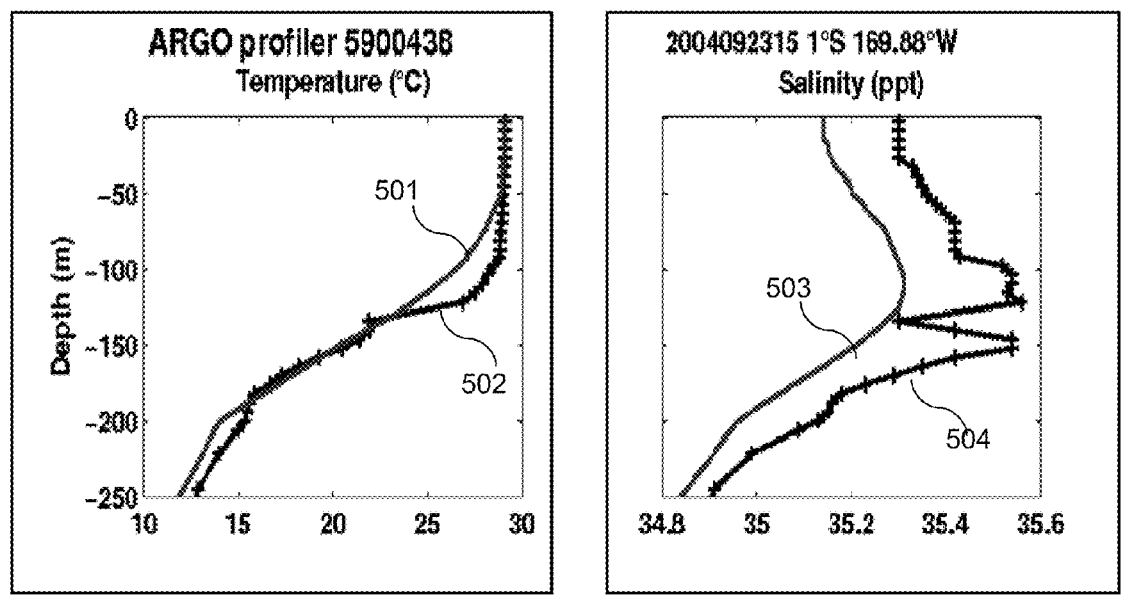
FIGS. 5A-5D depict plots of model-predicted values of temperature, salinity, sound speed and sound speed gradient as compared to observed values of those characteristics.
Figure 5C:
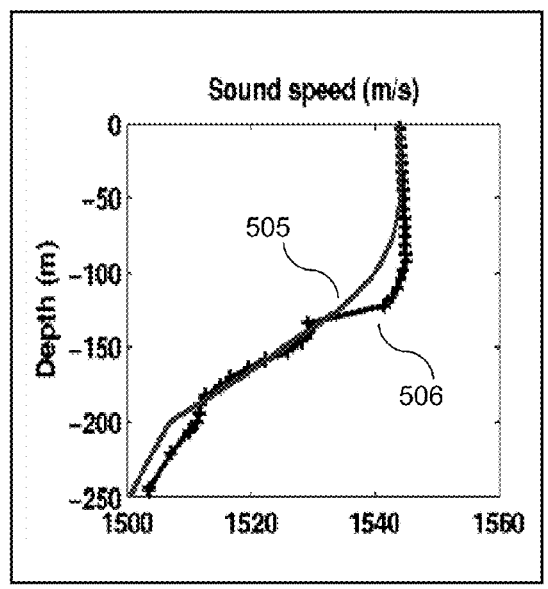
Figure 5D:
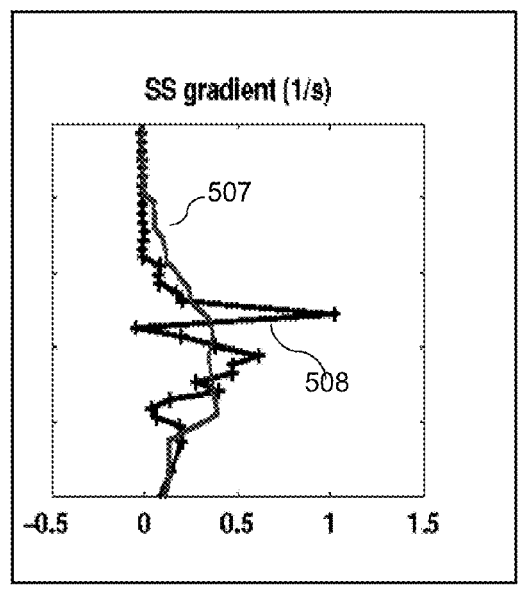

However, as seen in FIGS. 5A-5D, the modeled values of temperature, salinity, sound speed, and sound speed gradient generated using the MODAS synthetic profile differ in significant ways from the "true" values based on actual observations. For example, as shown in FIG. 5A, the plot 501 of modeled temperature vs. depth based on the MODAS profile underestimates the water temperature at depths from about 50 to 125 meters as compared to the actual temperature values 502, and thus misses the true base of the isothermal layer, which extends from the surface to about 100 meters, and instead estimates the base of the isothermal layer to be at about 50 meters. As seen in FIG. 5B, the modeled values 503 of salinity based on the MODAS synthetic profile also underestimate the true salinity value 504 at all points in the water column. These erroneous values of modeled temperature and salinity are perpetuated in the estimated values of sound speed and sound speed gradient. Thus, as seen in FIG. 5C, just as with the temperature plot shown in FIG. 5A, the modeled sound speed 505 fails to show the increase in sound speed from 0 to about 125 meters, instead estimating the maximum to occur at about 50 meters. A similar error is shown in FIG. 5D, where the estimated sound speed gradient 507 fails to show the observed change 508 in the gradient from positive to negative at 125 meters.

Due to these errors, the model will therefore give an incorrect value for the depth of the SLD, erroneously making it shallower than the actual depth. That is, as shown in FIG. 5C, the modeled maximum sound speed occurs at a significantly shallower depth than the actual depth of the maximum. More importantly, the modeled values of sound speed gradient shown in FIG. 5D miss the change in the gradient entirely. Because the SLD occurs at the point where the sound speed gradient changes from positive to negative, this error can be significant.

FIGS. 6A-6C and 7A-7E illustrate the effect of the errors in estimated SLD on the behavior of an exemplary sound transmission having a frequency f of 600 Hz issued by a source at a depth of 20 meters.

Figure 6A:
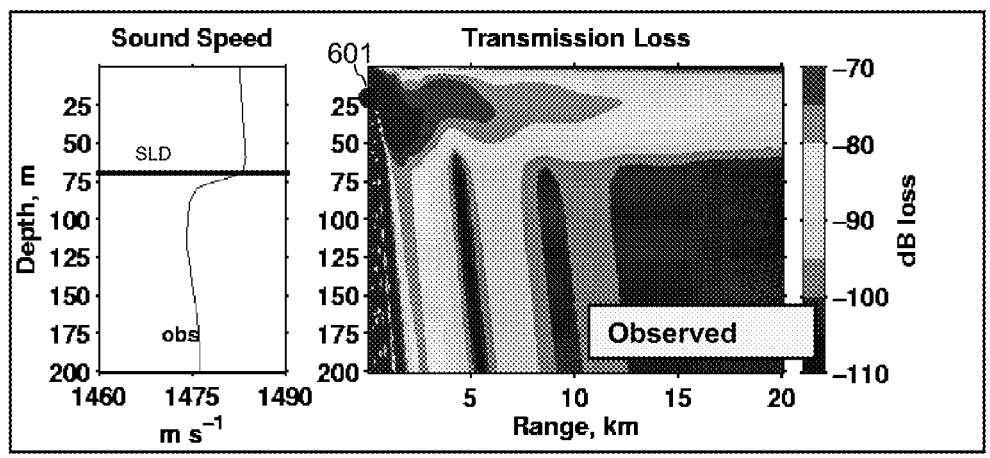
FIGS. 6A-6C depict comparisons of the effects of Sonic Layer Depth on transmission loss for observed values of sound speed and two different modeled values of sound speed.

FIG. 6A illustrates the "true," i.e., observed, case similar to the case discussed above with respect to FIG. 3A. Based on observed values, the SLD occurs at about 75 meters, where the sound speed reaches a maximum. As discussed above, MCF is inversely proportional to SLD, and thus a deeper SLD will give a lower MCF, while a shallower SLD will give a higher MCF. Because the 600 Hz transmission frequency f is higher than the MCF for that SLD, the sound will travel a great distance before attenuating. FIG. 6A also shows the geographic range for such a transmission, i.e., the distance that the sound travels before it suffers a loss of intensity of 80 dB. An 80 dB loss is a minimum threshold for acceptable system performance, and so will be used as a measure of maximum acceptable transmission loss in the discussion herein. The threshold for an actual system will likely differ but the fundamental relationships between transmission range, sound speed profile and SLD remain the same.

Figure 6B:
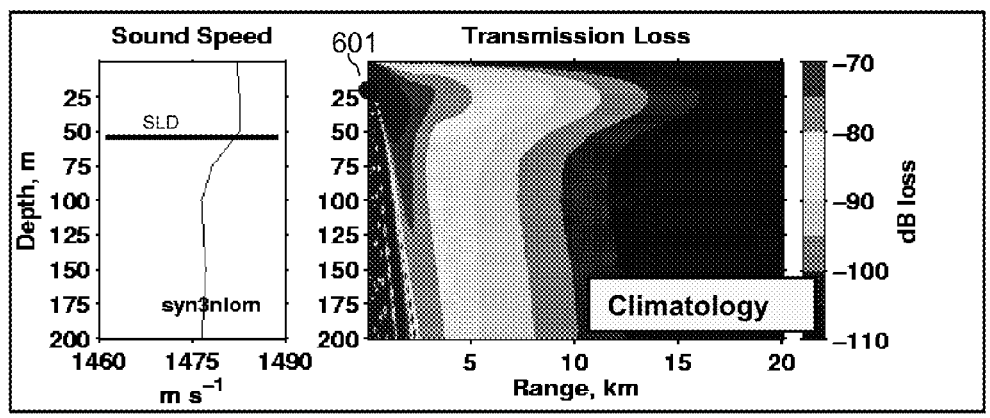
Figure 6C:
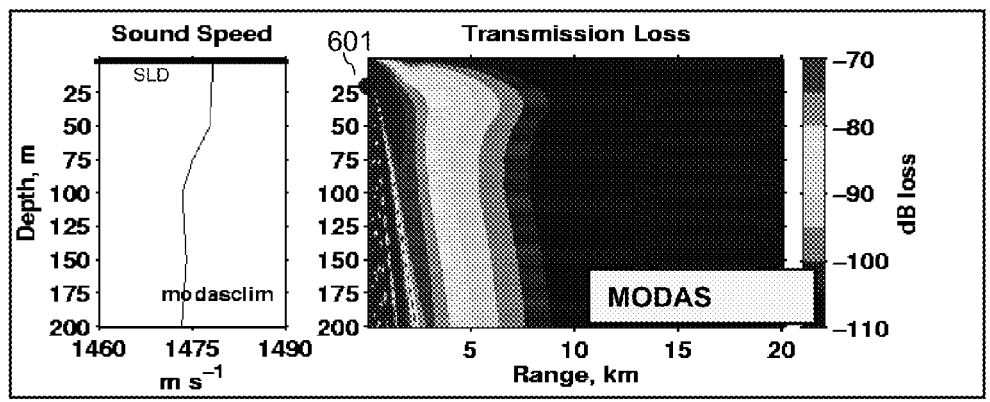

FIG. 6B shows estimated sound speed and sound attenuation for a model using historical climatologically determined values of temperature and salinity to model sound speed, and FIG. 6C shows estimated sound speed and sound attenuation for a model using a conventional MODAS synthetic profile of temperature and salinity according to the prior art. As seen in FIG. 6B, the climatological data-based model shows a modeled increase in sound speed from the surface to about 50 meters, and thus models an SLD of about 50 meters. However, this is depth is shallower than the true SLD, which, as shown in FIG. 6A, is about 75 meters. The conventional MODAS synthetic profile gives an even greater error. As seen in FIG. 6C, the model using a conventional MODAS synthetic profile shows a decrease, rather than an increase, in the speed of sound as it travels through the water, and thus the MODAS-modeled SLD occurs at or very near the surface.

These errors in modeled SLD can have several consequences. For example, if a system were deployed for acoustic communication or detection in the surface duct, the prediction with the shallow SLD would underestimate transmission range. This would lead to an over-allocation of resources, where sensors are placed closer together than is necessary to maintain coverage. If the ranges were known accurately, then the desired performance could be achieved with fewer sensors, saving time and money. On the other hand, if the range were in fact shorter than the predictions, the communication or surveillance system could have unexpected acoustic gaps that raise risk of failure. For example, a submarine could face significant risk of detection if it expected detection ranges to be short when in fact they are much longer.

Moreover, the error in modeled SLD can cause errors in the frequency used for underwater transmissions. As noted above, frequencies lower than the MCF are attenuated and so such transmissions may evade detection because they do not travel very far. Because the MCF is inversely proportional SLD, as the SLD becomes higher (i.e., "deeper"), the MCF decreases, and as the SLD becomes lower (i.e., shallower), the MCF increases. Also as noted above, sounds having a frequency lower than the MCF will attenuate quickly, while those having a higher frequency are trapped in the acoustic channel and will travel long distances without attenuation. Based on their modeled SLDs, which are shallower (lower) than the true SLD, both the climatological model and the standard MODAS model have a modeled MCF that is higher than the true MCF for the true SLD shown in FIG. 6A. Because of this error, the models "think" that an exemplary transmission having a frequency of 600 Hz is lower than the modeled MCF and thus is attenuated, as seen in FIGS. 6B and 6C, when in fact, the 600 Hz frequency is higher than the true MCF and, as seen in FIG. 6A, travels much farther without loss. In order to have actual attenuation, the transmission must be at a lower frequency than that predicted by the model. Thus, sounds from an object such as a submarine, which emits sounds at a particular frequency, may not be quickly attenuated but instead may be heard at great distances, reducing the ability of such an object to "hide" from detectors such as sonar arrays.

Figures 7A, 7B, 7C:
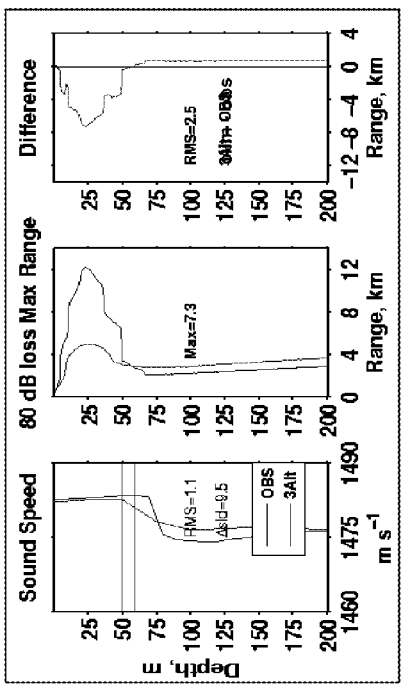
FIGS. 7A-7E further illustrate the impact of the modeled Sonic Layer Depth on predictions of acoustic behavior as compared to the observed Sonic Layer Depth.
Figure 7D:
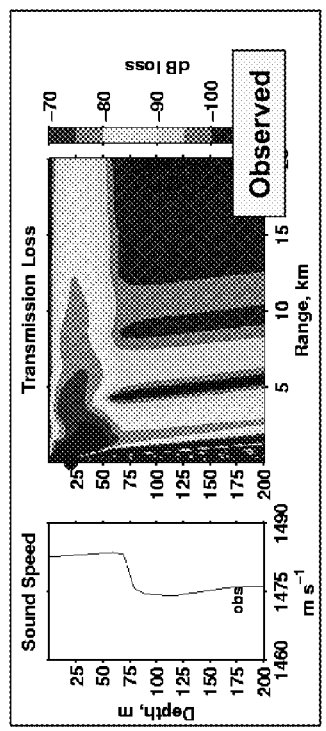
Figure 7E:
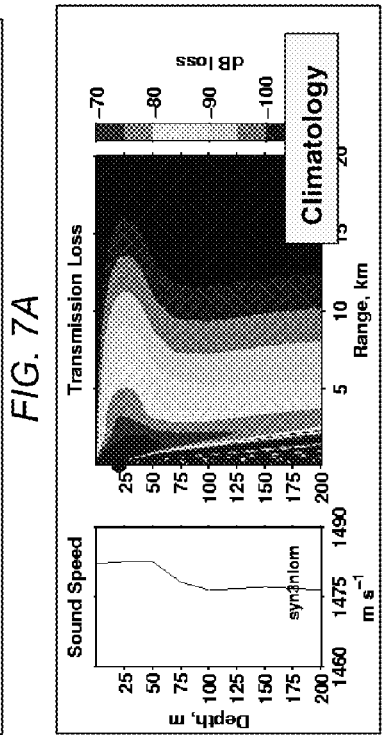

FIGS. 7A-7E provide further graphical depiction of the errors from the climatological and standard MODAS models. FIG. 7A is a duplicate of FIG. 6A from FIG. 6, and shows the true, observed plots of sound speed and transmission loss. FIGS. 7B and 7D also are duplicates of FIGS. 6B and 6C, respectively, from FIG. 6 and are provided for ease of reference. FIGS. 7C and 7E show the difference in the sound speed plots from models using climatological data (FIG. 7C) and the conventional MODAS profile of the prior art (FIG. 7E) superimposed on the plot of the actual observed sound speed shown in FIG. 7A. FIGS. 7C and 7E also show the plots of the transmission loss shown by each model superimposed on a plot of the true transmission loss and plots of the difference in transmission loss predicted by each model. Thus, FIGS. 7A-7E clearly show that models using either climatological data or the conventional MODAS profile of the prior art significantly misestimate the depth of the sound speed maximum for an exemplary 600 Hz transmission and significantly underestimate the distance at which that transmission will experience an 80 dB loss in intensity.

The inventors have discovered that if the temperature and salinity values in a synthetic profile are estimated to have shapes that more closely follow those resulting from a better estimate of the Mixed Layer Depth (MLD), the profile will more closely reflect actual conditions of temperature and salinity that influence acoustic transmission. As a result, modeled values of sound speed and Sonic Layer Depth, and thus the modeled behavior of an exemplary transmission, are much improved and are closer to the true, observed values.

The present invention provides a modified synthetic profile that provides a distinct transition in the predicted temperature $\check{T}(z)$ and salinity $\check{S}(z)$ at the base of the MLD by using different profiles for temperature and salinity at depths above and below the base of the mixed layer. This more accurately reflects the observed conditions at an actual Mixed Layer Depth, and so permits the modeling of a more accurate sound speed profile than is possible using conventional modeling.

Thus, the MLD-modified MODAS synthetic profile of present invention modifies the way in which predicted values for temperature and salinity are determined. The method used to determine the temperature and salinity in the MLD-modified MODAS synthetic profile of the present invention includes first identifying an appropriate MLD and then calculating predicted temperature and salinity as a function of MLD and depth. These steps are described in more detail below.

First, the MLD-modified MODAS synthetic profile of the present invention receives information of the actual measured MLD or a better prediction of the MLD for the area of interest and determines which is deeper, the actual measured MLD value, referred to hereinafter as $MLD_{observed}$, or the MLD value predicted by the synthetic profile, referred to hereinafter as $MLD_{profiled}$. If $MLD_{profiled}$ is greater (i.e., deeper) than $MLD_{observed}$, then $MLD_{profiled}$ will be used in the MLD-modified MODAS profile. On the other hand, if $MLD_{profiled}$ is less than $MLD_{observed}$, then $MLD_{observed}$ will be used. Then, the MLD-modified MODAS synthetic profile derives a predicted temperature $\check{T}(z)$ and salinity $\check{S}(z)$, which differs depending on whether the depth at the point of interest is deeper than the MLD value used, i.e., whether z is deeper than $MLD_{observed}$ or $MLD_{profiled}$, whichever is deeper. By varying the method of predicting temperature and salinity at depth z based on a comparison of z versus Mixed Layer Depth, the MLD-modified MODAS synthetic profile better represents the shape of the temperature and salinity profile, which in turn permits ocean models to produce better sound speed profiles and better estimates of the SLD. If more accurate surface temperature and salinity data, i.e., $T_{surface}$ and $S_{surface}$, are available as well, then these values also can be projected into a refined isothermal and isohaline surface layer that better represents the sound speed transition across the SLD. This will allow a more accurate determination of the sound speed gradient across the SLD, which in turn will provide more accurate estimates of the MCF.

Figure 8:
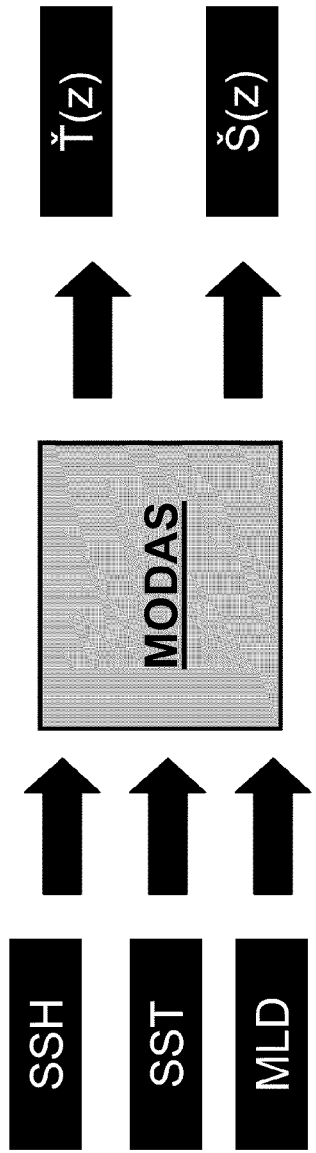
FIG. 8 depicts aspects of an MLD-modified MODAS synthetic profile of temperature and salinity according to the present invention.
Figure 8:
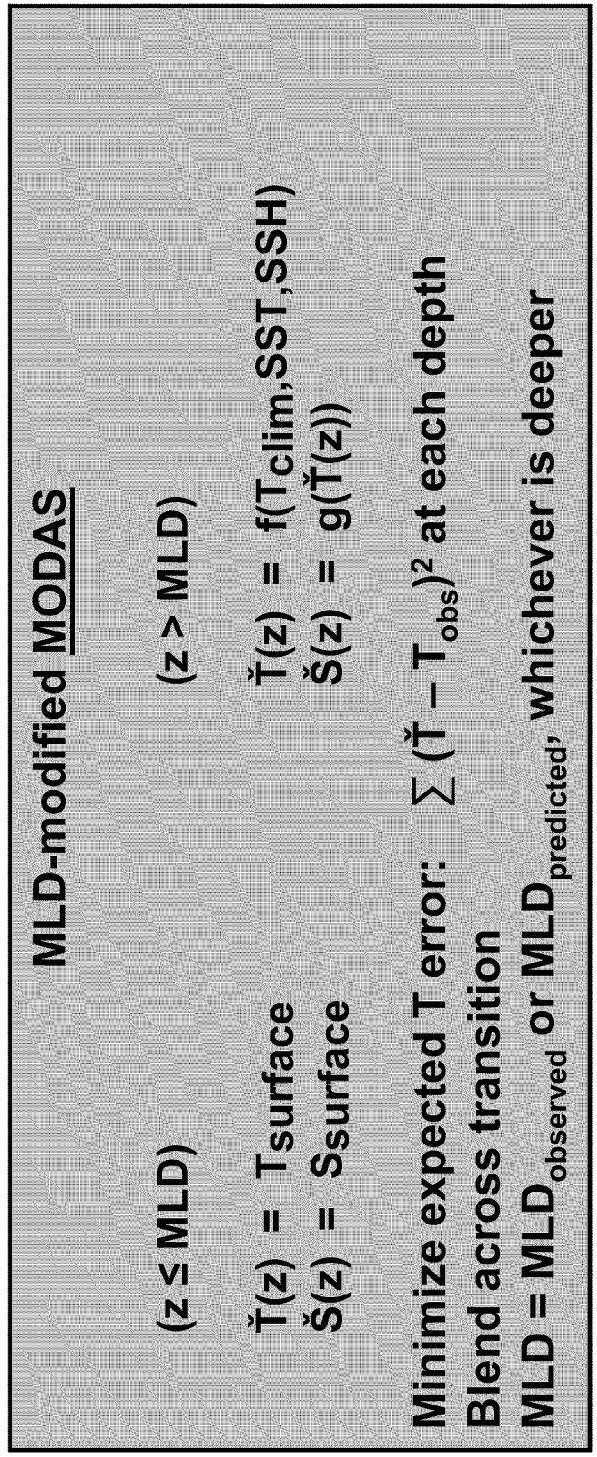

An exemplary methodology of the present invention is shown in FIG. 8. It should be noted that although the methodology is shown and described in the context of the MODAS synthetic profile used by the U.S. Navy, the principles and methods of the invention can be used to modify any synthetic ocean profile and can provide improved predictions of sound speed profile and SLD as a result of the improved predictions of temperature and salinity given by the method described herein.

As shown in FIG. 8, the MLD-modified MODAS synthetic profile of the present invention takes as inputs the values of the sea surface height SSH, sea surface temperature SST, and Mixed Layer Depth MLD (both actual and predicted), and derives a predicted temperature $\check{T}(z)$ and salinity $\check{S}(z)$ based on these inputs and information regarding the measured surface temperature $T_{surface}$ and measured surface salinity $S_{surface}$. If the depth z at which the predicted temperature $\check{T}(z)$ and predicted salinity $\check{S}(z)$ is less than or equal to the applicable MLD (i.e., greater than $MLD_{observed}$ or $MLD_{profiled}$), then the estimated $\check{T}(z)$ and $\check{S}(z)$ for the synthetic profile at those depths are $\check{T}(z) = T_{surface}$ and $\check{S}(z) = S_{surface}$, where $T_{surface}$ and $S_{surface}$ are the measured values of T and S at the surface, respectively. On the other hand, if z is greater than the MLD, the estimated temperature and salinity are calculated as for the standard MODAS synthetic described above, i.e., $\check{T}(z) = f(T_{clim}, SSH, SST)$ and $\check{S}(z) = g(\check{T}(z))$.

Thus, the MLD-modified MODAS synthetic profile of the present invention uses a two-step process to calculate the predicted values of temperature and salinity $\check{T}(z)$ and $\check{S}(z)$ at a depth z. First, the appropriate MLD is identified, based on a determination of which value of MLD, $MLD_{observed}$ or $MLD_{profiled}$ is greater. Then, the depth at which the temperature and salinity is to be estimated is compared to the MLD, and based on that comparison, the appropriate algorithm for determining the predicted temperature $\check{T}(z)$ and salinity $\check{S}(z)$ is identified and applied.

Figure 9:
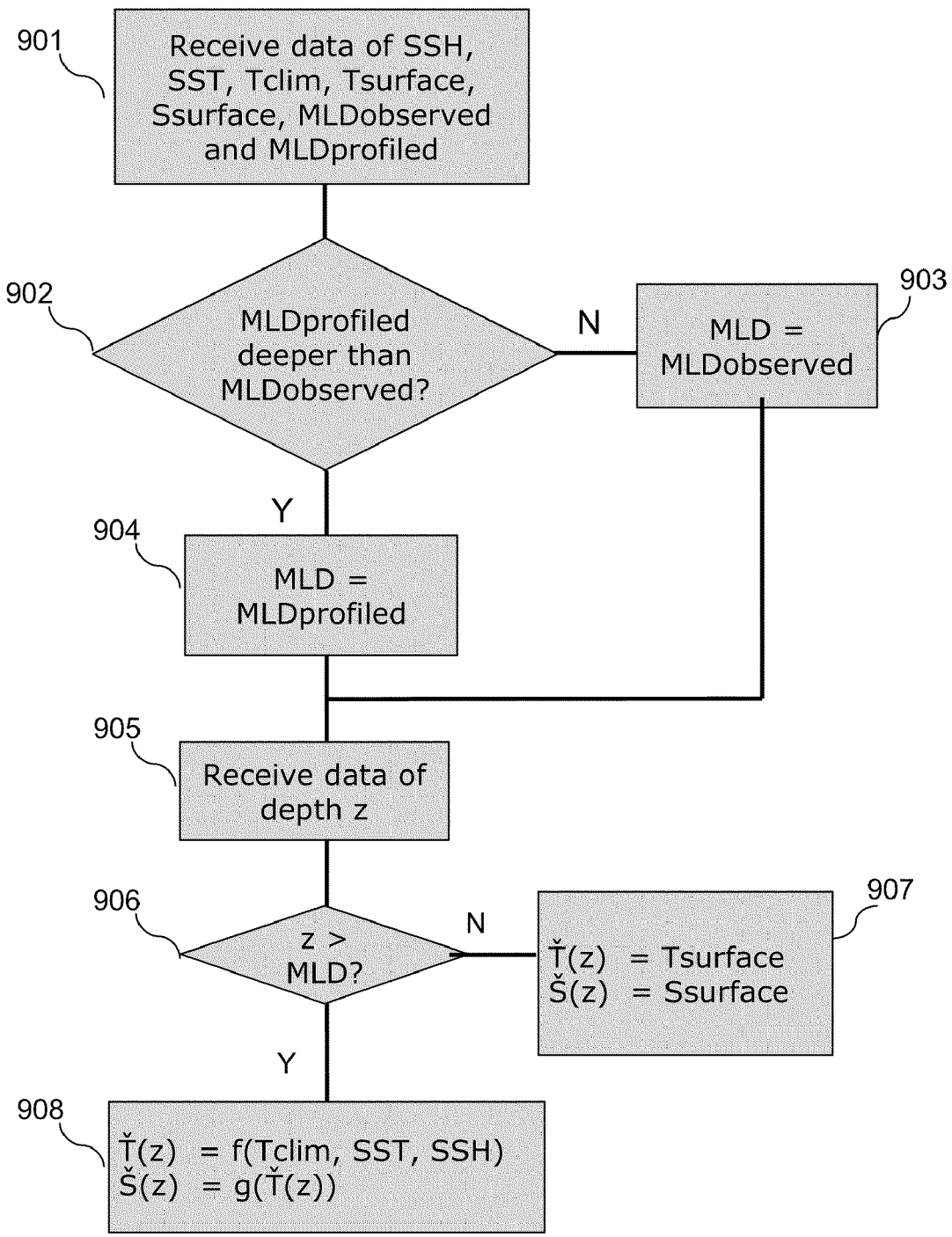
FIG. 9 is a flow diagram depicting an exemplary logic flow for creating an MLD-modified MODAS synthetic profile according to the present invention.

The method of the present invention can be seen in more detail by reference to the flow diagram in FIG. 9. The method begins at step 901, where data for use in the MLD-modified MODAS profile is received by a processor. This data includes data of sea surface height SSH, sea surface temperature SST, temperature from climatological data $T_{clim}$, temperature at the surface $T_{surface}$, salinity at the surface $S_{surface}$, and $MLD_{observed}$ and $MLD_{profiled}$ as described above. At step 902, the processor then checks to determine whether $MLD_{profiled}$ is deeper than $MLD_{observed}$. If $MLD_{profiled}$ is not deeper than $MLD_{observed}$, then at step 903, the value of MLD is set to the value of $MLD_{observed}$ for the remainder of the processing. If, on the other hand, $MLD_{profiled}$ is deeper than $MLD_{observed}$, then at step 904, MLD is set to $MLD_{profiled}$. Next, at step 905, data of the depth z at which temperature and salinity are to be profiled is received. At step 906, depth z is compared to the MLD which was determined in steps 903/904. If z is not greater than MLD, i.e., for depths within the mixed layer, at step 907, the predicted values of the temperature and salinity are set to the surface temperature irrespective of the value of z, i.e., $\check{T}(z) = T_{surface}$, and surface salinity, i.e., $\check{S}(z) = S_{surface}$. For depths below the mixed layer, i.e., z is greater than MLD, at step 908, the predicted temperature and salinity at each depth z will vary as the climatological temperature data, the measured sea surface temperature, and measured sea surface height, i.e., $\check{T}(z) = f(T_{clim}, SST, SSH)$ and $\check{S}(z) = g(\check{T}(z))$.

Thus, an MLD-modified synthetic profile according to the present invention has a constant temperature and salinity at depths at or above the mixed layer and produces a distinct transition in the profiled temperature and salinity values at the base of the mixed layer, in contrast to conventional synthetic profiles, which average the transition over a broader range of temperatures. Because temperature and salinity are nearly constant throughout the MLD, an MLD-modified synthetic profile according to the present invention, more accurately represents observed conditions than do conventional synthetic profiles. In addition, an MLD-modified synthetic profile according to the present invention provides a more accurate mixed layer depth estimate than conventional synthetic profiles, which tend to have a shallow bias in their estimates of mixed layer depth. Most important, the MLD-profile produces a more accurate shape of the sound speed profile, leading to more accurate predictions of acoustic transmission.

As noted above, in an alternative embodiment of the present invention, the method can be used to predict a three-dimensional profile of temperature as a function of latitude and longitude as well as depth by using an $MLD_{profiled}$ which is also a function of latitude and longitude. In such a case, the estimated profiles may vary at each latitude and longitude location, improving not only the vertical representation of the shape of sound speed profiles at each point but also more accurately representing horizontal gradients of sound speed. The examples shown demonstrate a range independent predictions of acoustic transmission. In fact acoustic transmission is a range-dependent phenomenon that is more accurately determined using spatially-varying sound speed fields based on three-dimensional MLD-modified synthetic profiles.

These improvements in synthetic profile using the temperature and salinity estimates in the MLD-modified profile of the present invention enable improved predictions of sound speed and sonic layer depth SLD. The results of these improved speed and SLD predictions are shown graphically in FIGS. 10A-10C and 11A-11C as discussed below.

Figure 10A:
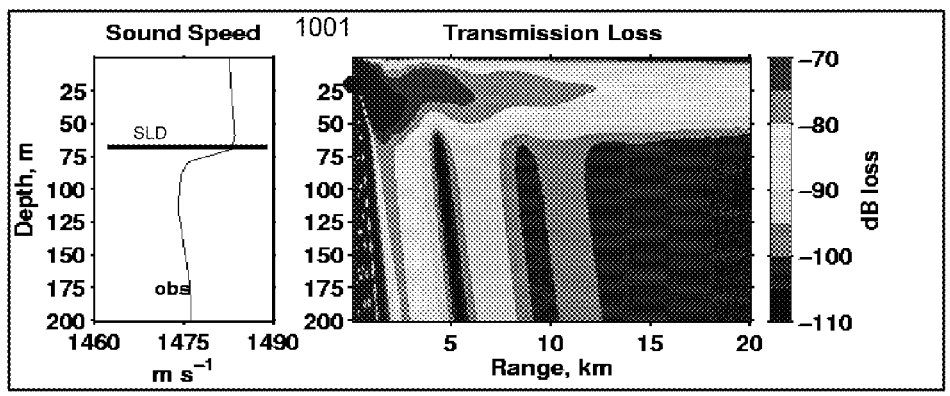
FIGS. 10A-10C depict comparisons of the effects of Sonic Layer Depth on transmission loss for a Sonic Layer Depth in accordance with the MLD-modified MODAS synthetic profile of the present invention as compared to the observed Sonic Layer Depth and a Sonic Layer Depth according to a standard model.
Figure 10B:
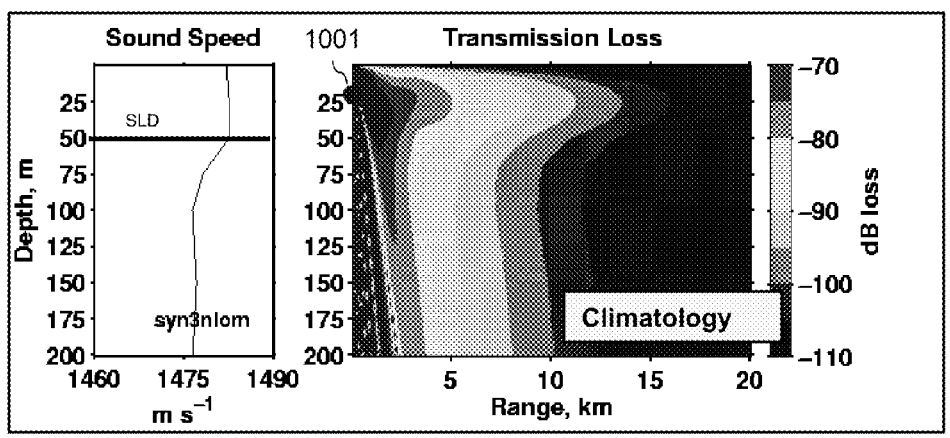
Figure 10C:
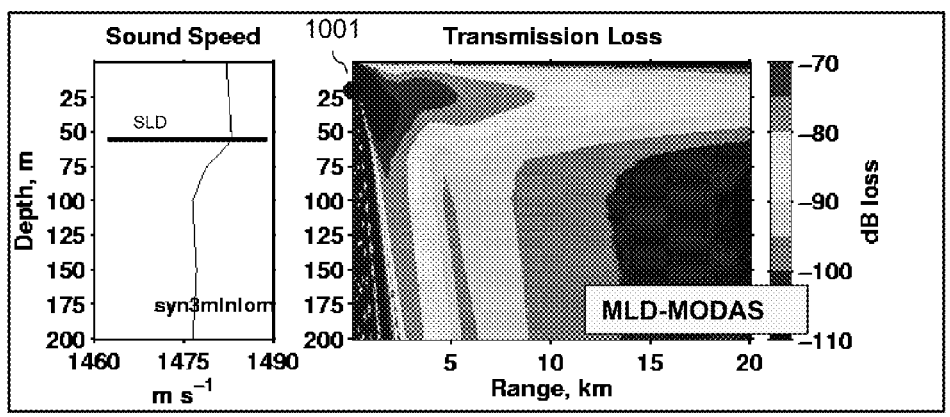

FIGS. 10A-10C depict similar plots as are shown in FIGS. 6A-6C. FIGS. 10A and 10B are duplicates of FIGS. 3A and 6A and FIGS. 3B and 6B, respectively, and like those figures, show sound speed and transmission loss for an exemplary 600 Hz sound signal transmitted from a source 1001 located at a depth of about 25 meters, with FIG. 10A showing the true sound speed and transmission loss based on observations and FIG. 10B showing modeled sound speed and transmission loss using climatological values of temperature and salinity as inputs.

FIG. 10C shows plots of modeled sound speed and transmission loss using values of temperature and salinity from the MLD-modified MODAS synthetic profile of the present invention. As can easily be seen in FIG. 10C, the modeled sound speed plot shows that the sound speed reaches a maximum at an SLD of about 60 meters, which is close to the actual SLD of about 75 meters shown in FIG. 10A, closer than the climatological data-modeled SLD of about 50 meters shown in FIG. 10B, and much closer to the actual SLD than the SLD modeled using the conventional MODAS profile shown in FIG. 6C. The more accurate prediction of SLD from use of the MLD-modified synthetic profile of the present invention is also reflected in the plot of transmission loss shown in FIG. 10C, which is clearly seen as being very similar to the plot of "true" transmission loss shown in FIG. 10A, and much closer to the true loss than the transmission loss predicted by the climatological data-based model shown in FIG. 10B.

FIGS. 11A-11E further show the improvement in predicted values of sound speed and transmission loss resulting from use of the MLD-modified MODAS synthetic profile of the present invention. FIGS. 11A, 11B, and 11C correspond to FIGS. 7A, 7B, and 7C discussed above, and are presented for ease of comparison with FIGS. 11D and 11E. As easily seen in FIG. 11E, the modeled sound speed profile generated through use of the MLD-modified synthetic profile of the present invention very closely tracks the "true" profile of sound speed at all depths, and particularly at depths at or above the SLD. The transmission loss plot also closely parallels the "true" transmission loss plot, and does so much more closely than does the climatological data-based model. Finally, the "Difference" plot of FIG. 11C shows that there is little difference between the modeled transmission range for the exemplary 600 Hz acoustic signal and the "true" transmission range for that signal, and shows a significant improvement in accuracy of the modeled transmission range over the predicted range using the climatological data profile (FIGS. 7C/11C) or the conventional MODAS profile (FIG. 7E).

Note that while the method is described in terms of a MLD-modified synthetic, it is equally applicable as an SLD-modified synthetic. The system envisions using real-time predictions of MLD based on a history of atmospheric forcing, but if real time information on the SLD were available, the method could be applied substituting SLD for MLD with even better results for acoustic predictions.

Thus, the MLD-modified synthetic ocean profile of the present invention provides at least the following advantages over the conventional synthetic profiles of the prior art.

The invention produces a distinct transition of temperatures at the base of the mixed layer that more accurately represents the observed conditions at an actual mixed layer depth, while conventional profiles average the transition over a broader range of temperature in a manner inconsistent with observed values. This distinct transition produces profiles with more accurate mixed layer depth estimates than the smooth transition of conventional profiles, which tends to have a shallow bias in mixed layer depth estimates.

The invention also produces a more accurate estimate of the sonic layer depth than produced by conventional profiles, which tend to produce a shallow bias in estimates of sonic layer depth. In addition, because the sonic layer depth is used to predict the frequencies that will be trapped in the surface acoustic duct, the more accurate sonic layer depth estimates produced by the synthetic profile of the present invention enable more accurate prediction of the minimum frequencies that will be trapped within the surface duct or surface sound channel, whereas the conventional profile leads to a high bias in estimates of the minimum cutoff frequency. This high bias would be more likely to produce a false negative indicator that a particular frequency is trapped, i.e., predicting that a frequency is not trapped when in fact it is trapped.

The invention also provides more accurate estimates of the spreading of acoustic signals. An acoustic signal trapped in the surface duct will spread approximately cylindrically, whereas a signal that is not trapped will spread spherically; this results in greatly increased horizontal transmission ranges for trapped frequencies than for "non-trapped" frequencies. Thus, the more accurate estimates of SLD and the shape of the sound speed profile produced by the present invention will give better estimates of whether a transmission of a given frequency will be trapped, and so will provide more accurate estimates of the horizontal range of the transmission, whereas conventional profiles lead to underestimates in the signal's horizontal transmission range.

The more accurate estimates of horizontal transmission range provided by the invention support more accurate estimates of the probability of detection. This enables a proper allocation of resources for force protection and proper estimates of the vulnerability of underwater objects such as submarines to detection by both surface-based and underwater sensors. Estimates made using conventional profiles can lead to underestimates in the likelihood of detection, which produce underestimates of vulnerability and overestimates of resources needed for adequate force protection.

The invention also produces profiles that more accurately represent the gradients in temperature and sound speed below the mixed layer depth or the sonic layer depth, also known as the below-layer gradient, or BLG. The smoother transitions in temperature predicted by conventional profiles tend to have a unrealistically weak BLG, while a sharp transition at the mixed layer leads to a stronger and generally more realistic BLG, as the sharp layer decreases the depth range between the MLD and the deeper, more consistent portions of the profile. BLG is calculated as a temperature difference divided by a change in depth. If the change in depth is 100 m, then BLG is (temperature just above the MLD minus temperature at MLD+100 m), all divided by 100 m. A weak gradient has a smaller difference in temperature, while a strong gradient has a larger difference in temperature. The more accurate BLG produced by the present invention leads to more accurate estimates of the acoustic energy that escapes the surface duct, and therefore provides more accurate paths of acoustic propagation and interaction with the sea floor. The weak estimates of the BLG produced using conventional profiles underestimate downward refraction of acoustic energy escaping the surface duct and thus produce less-accurate estimates of refraction, propagation, and bottom interaction.

The method of the present invention is applicable at any vertical resolution and is limited only by the accuracy of the MLD or SLD estimates and the vertical resolution of output profile. This contrasts with the method for determining temperature and salinity in the conventional MODAS profile, which is limited by the native vertical grid of the climatological regression coefficients, which tends to produce a shallow MLD bias.

Finally, assimilation of the MLD-modified synthetic profiles produced by the present invention into ocean models and data assimilation systems tends to produce more accurate estimates of MLD, SLD, and BLG than does assimilation of conventional synthetic profiles of the prior art. Output of assimilative models that incorporate the MLD-modified synthetic profiles of the present invention tend to have advantages similar to those produced by direct use of the modified profiles described above.

It should be noted that aspects of a method for producing an MLD-modified synthetic ocean profile as described herein can be accomplished by executing one or more sequences of one or more computer-readable instructions read into a memory of one or more computers from volatile or non-volatile computer-readable media capable of storing and/or transferring computer programs or computer-readable instructions for execution by one or more computers. Volatile computer readable media that can be used can include a compact disk, hard disk, floppy disk, tape, magneto-optical disk, PROM (EPROM, EEPROM, flash EPROM), DRAM, SRAM, SDRAM, or any other magnetic medium; punch card, paper tape, or any other physical medium. Non-volatile media can include a memory such as a dynamic memory in a computer. In addition, computer readable media that can be used to store and/or transmit instructions for carrying out methods described herein can include non-physical media such as an electromagnetic carrier wave, acoustic wave, or light wave such as those generated during radio wave and infrared data communications.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein. Such embodiments are also contemplated to be within the scope and spirit of the present disclosure.

What is claimed is:

1. A computer-implemented method for estimating profiled characteristics in a synthetic profile of a body of water at a depth of interest, comprising:
   receiving data of an observed surface temperature of the water, an observed surface height of the water, and an observed mixed layer depth of the water;
   receiving data of a profiled mixed layer depth of the water;
   receiving data of a climatological average temperature of the water at the depth of interest;
   comparing by the computer the profiled mixed layer depth to the observed mixed layer depth to determine a reference mixed layer depth, the reference mixed layer depth being the deeper of the profiled mixed layer depth and the observed mixed layer depth;
   comparing by the computer the depth of interest to the reference mixed layer depth;
   setting by the computer a value of a synthetic temperature of the water at the depth of interest as a function of the climatological average temperature, the observed surface temperature, and the observed surface height if the depth of interest is greater than the reference mixed layer depth; and
   setting by the computer the value of the synthetic temperature of the water at the depth of interest to the observed surface temperature of the water if the depth of interest is not greater than the reference mixed layer depth, wherein the water is represented as isothermal at depths equal to and above the reference mixed layer depth.

2. The method according to claim 1, further comprising:
   receiving data of a predicted surface temperature of the water, a predicted surface height of the water, and a predicted mixed layer depth of the water;
   setting the value of the synthetic temperature of the water at the depth of interest as a function of the climatological average temperature, the predicted surface temperature, and the predicted surface height if the depth of interest is greater than the reference mixed layer depth; and
   setting the value of the synthetic temperature of the water at the depth of interest to the predicted surface temperature of the water if the depth of interest is not greater than the reference mixed layer depth, wherein the water is represented as isothermal at depths equal to and above the reference mixed layer depth.

3. The method according to claim 1, further comprising:
   receiving data of a predicted surface temperature of the water, a predicted surface height of the water, and a predicted mixed layer depth of the water; and
   comparing the predicted mixed layer depth to the profiled mixed layer depth and the observed mixed layer depth to determine the reference mixed layer depth, the reference mixed layer depth being the deepest of the predicted mixed layer depth, the profiled mixed layer depth, and the observed mixed layer depth.

4. The method according to claim 3, further comprising
   setting the value of the synthetic temperature of the water at the depth of interest as a function of the climatological average temperature, one of the observed and the predicted surface temperature, and one of the observed and the predicted surface height if the depth of interest is greater than the reference mixed layer depth; and
   setting the value of the synthetic temperature of the water at the depth of interest to one of the observed and the predicted surface temperature of the water if the depth of interest is not greater than the reference mixed layer depth, wherein the water is represented as isothermal at depths equal to and above the reference mixed layer depth.

5. The method according to claim 1, further comprising:
   receiving data of an initial synthetic temperature profile of the water, the profiled mixed layer depth being determined from the initial synthetic temperature profile;
   setting the value of the synthetic temperature of the water at the depth of interest as a function of a temperature in the initial synthetic temperature profile, one of the observed and the predicted surface temperature, and one of the observed and the predicted surface height if the depth of interest is greater than the reference mixed layer depth; and
   setting the value of the synthetic temperature of the water at the depth of interest to one of the observed and the predicted surface temperature of the water if the depth of interest is not greater than the reference mixed layer depth, wherein the water is represented as isothermal at depths equal to and above the reference mixed layer depth.

6. The method of claim 1, further comprising:
   receiving data of an observed surface salinity of the water;
   receiving data of an initial synthetic salinity profile of the water;
   setting a value of a synthetic salinity of the water at the depth of interest as a function of the observed surface salinity, the initial synthetic salinity profile, and the depth of interest if the depth of interest is greater than the reference mixed layer depth; and setting the value of the synthetic salinity of the water at the depth of interest to the observed surface salinity of the water if the depth of interest is not greater than the reference mixed layer depth, wherein the water is represented as isohaline at depths equal to and above the reference mixed layer depth.

7. The method according to claim 6, further comprising:
receiving data of a predicted surface salinity of the water;
setting the value of the synthetic salinity of the water at the depth of interest as a function of the predicted surface salinity, the initial synthetic salinity profile, and the depth of interest if the depth of interest is greater than the reference mixed layer depth; and
setting the value of the synthetic salinity of the water at the depth of interest to the predicted surface salinity of the water if the depth of interest is not greater than the reference mixed layer depth, wherein the water is represented as isohaline at depths equal to and above the reference mixed layer depth.

8. The method according to claim 5, further comprising:
receiving data of an observed surface salinity of the water;
receiving data of an initial synthetic salinity profile of the water;
receiving data of a predicted surface salinity of the water;
setting a value of a synthetic salinity of the water at the depth of interest as a function of one of the observed and the predicted surface salinity, the initial synthetic salinity profile, and the depth of interest if the depth of interest is greater than the reference mixed layer depth; and
setting the value of the synthetic salinity of the water at the depth of interest to one of the observed and the predicted surface salinity of the water if the depth of interest is not greater than the reference mixed layer depth, wherein the water is represented as isohaline at depths equal to and above the reference mixed layer depth.

9. The method of claim 8, further comprising:
setting a plurality of values of the synthetic temperature and the synthetic salinity at a plurality of depths, the depths including at least one depth less than the reference mixed layer depth and at least one depth greater than the reference mixed layer depth; and
calculating a density profile of the water based on the plurality of the synthetic temperature and salinity values.

10. The method of claim 9, further comprising:
calculating an estimated mixed layer depth based on the density profile;
comparing the estimated mixed layer depth to at least one of the predicted mixed layer depth, the profiled mixed layer depth and the observed mixed layer to determine a modified reference mixed layer depth, the modified reference mixed layer depth being the deepest of the estimated depth, the predicted depth, the profiled depth, and the observed depth; and
modifying at least one of the synthetic temperature and synthetic salinity values based on a comparison of the depth of interest to the modified reference mixed layer depth.

11. The method of claim 8, further comprising:
setting a plurality of values of the synthetic temperature and the synthetic salinity at a plurality of depths, the depths including at least one depth less than the reference mixed layer depth and at least one depth greater than the reference mixed layer depth;
setting a synthetic speed of sound at each of the plurality of depths, the synthetic speed of sound at each depth being based on at least one of the observed values of temperature and salinity, the predicted values of temperature and salinity, and the synthetic values of temperature and salinity at that depth; and
calculating a sound speed profile of the water based on the plurality of the synthetic temperature and salinity values.

12. The method according to claim 11, further comprising:
calculating a profiled sonic layer depth of the water based on the sound speed profile;
comparing the profiled sonic layer depth to at least one of a synthetic mixed layer depth, the predicted mixed layer depth, and the observed mixed layer depth to determine a reference sonic layer depth, the reference sonic layer depth being deepest of the profiled sonic layer depth, the profiled mixed layer depth, the predicted mixed layer depth, and the mixed layer observed depth;
wherein the depth of interest is compared to the sonic layer depth instead of the mixed layer depth in setting the values of the synthetic temperature and the synthetic salinity.

13. A computer-implemented method for calculating a density profile of a body of water, the density profile including values of temperature and salinity at a corresponding plurality of depths of the water, comprising:
receiving data of a reference mixed layer depth of the water;
receiving data of a plurality of observed values of temperature and salinity at the plurality of depths of the water;
receiving data of a plurality of predicted values of temperature and salinity at the plurality of depths of the water;
receiving data of a plurality of synthetic values of a temperature and a salinity at the plurality of depths of the water, the synthetic values of the temperature and the salinity at each depth being a value determined by a function if the depth is greater than the reference mixed layer depth and being a constant value if the depth is not greater than the reference mixed layer depth;
and calculating by the computer a density of the water at each of the plurality of depths based on at least one of the observed values of temperature and salinity, the predicted values of temperature and salinity, and the synthetic values of temperature and salinity.

14. The method according to claim 13, wherein the synthetic values of temperature and salinity at each depth are a value determined by a function if the depth is greater than a reference sonic layer depth and being a constant value if the depth is not greater than the reference sonic layer depth.

15. A computer-implemented method of calculating a sound speed profile of a body of water, the sound speed profile including values of sound speed at a corresponding plurality of depths of the water, comprising:
receiving data of a reference mixed layer depth of the water;
receiving data of a plurality of observed values of temperature and salinity at the plurality of depths of the water;
receiving data of a plurality of predicted values of temperature and salinity at the plurality of depths of the water;
receiving data of a plurality of synthetic values of a temperature and a salinity at the plurality of depths of the water, the synthetic values of the temperature and the salinity at each depth being a value determined by a function if the depth is greater than the reference mixed layer depth and being a constant value if the depth is not greater than the reference mixed layer depth;
and calculating by the computer a speed of sound in the water at each of the plurality of depths based on at least one of the observed values of temperature and salinity, the predicted values of temperature and salinity, and the synthetic values of temperature and salinity.

16. The method according to claim 15, wherein the synthetic values of temperature and salinity at each depth are a value determined by a function if the depth is greater than a reference sonic layer depth and being a constant value if the depth is not greater than the reference sonic layer depth.

* * * * *